United States Patent Office 3,198,273
Patented Aug. 3, 1965

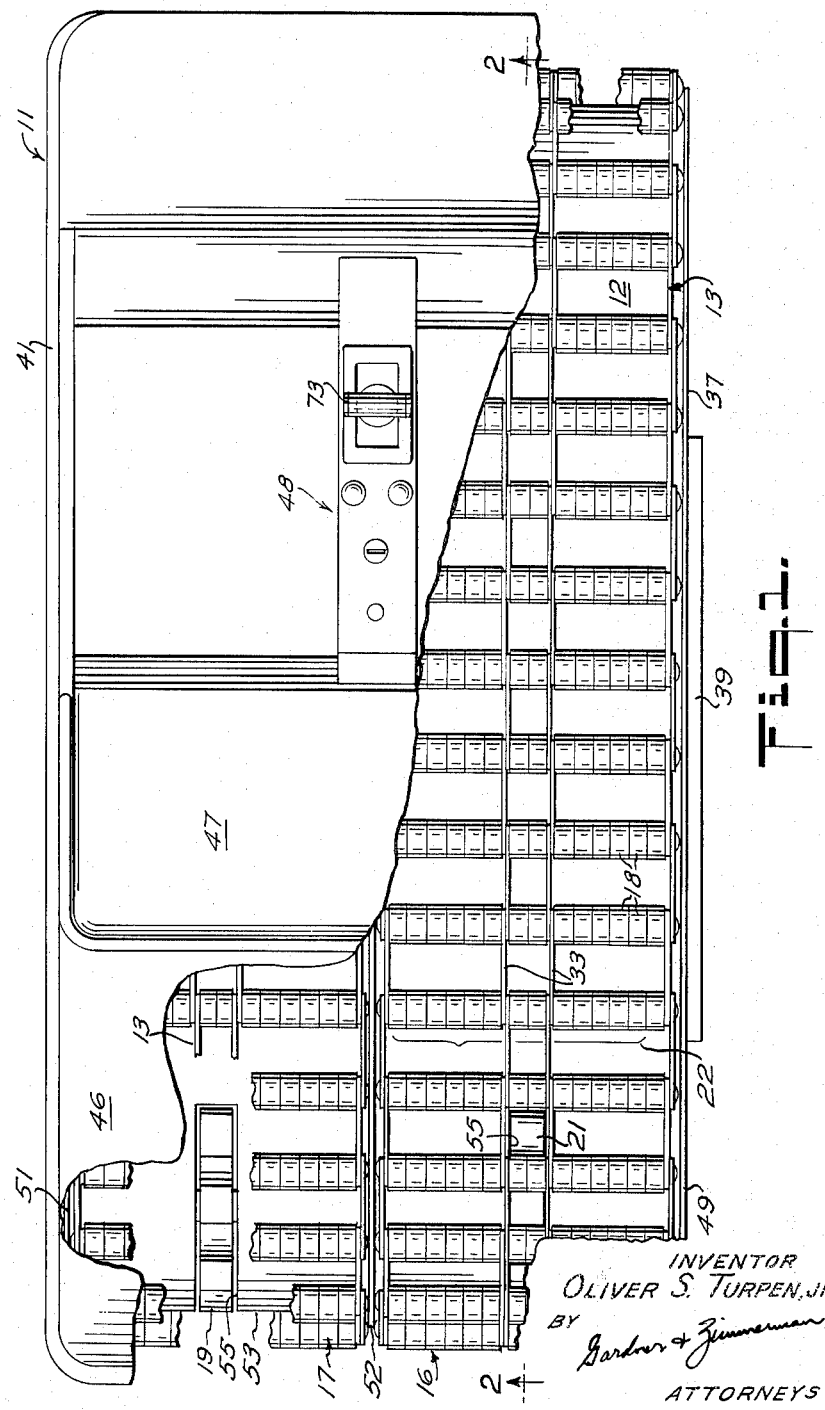

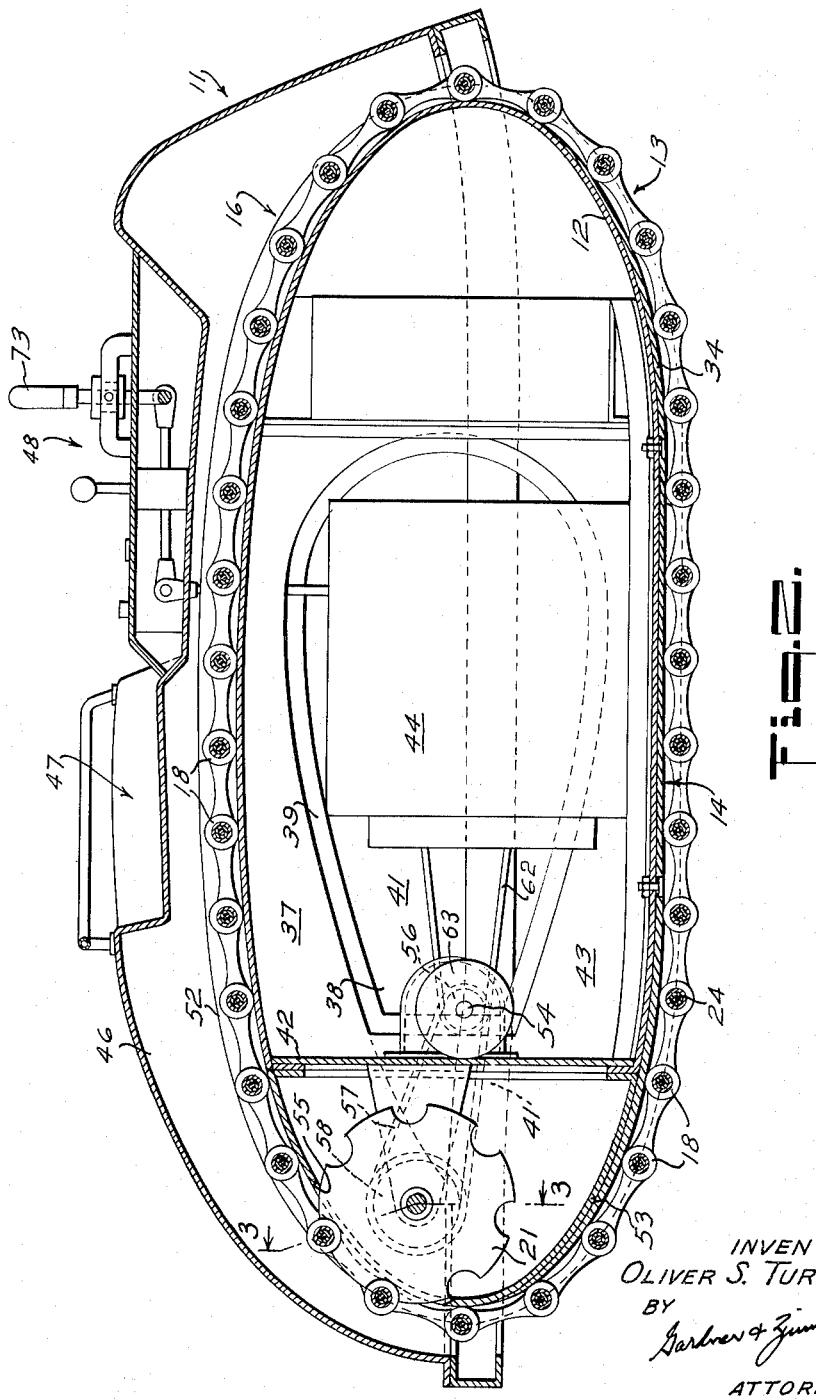

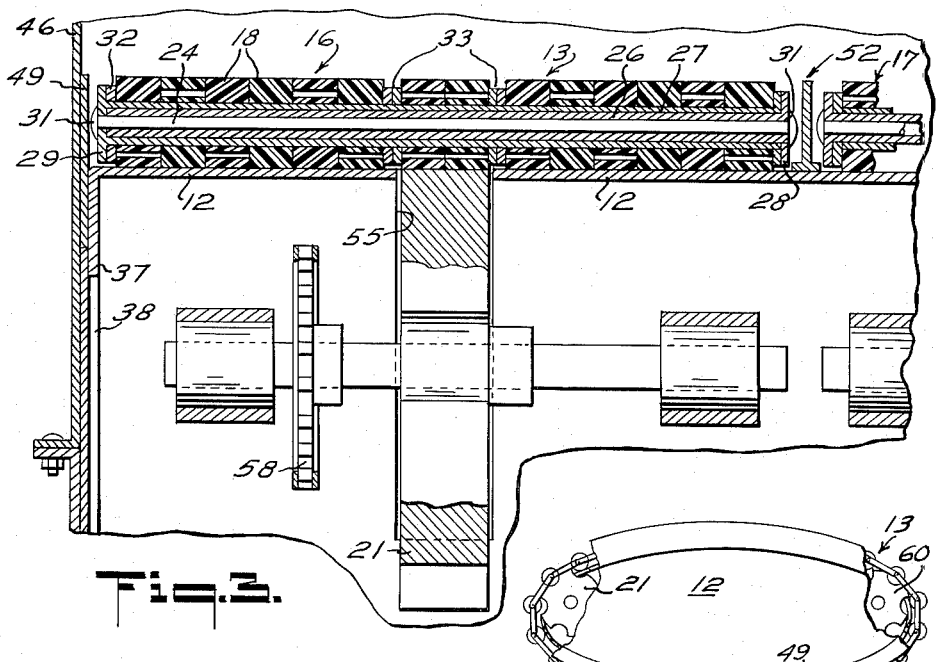
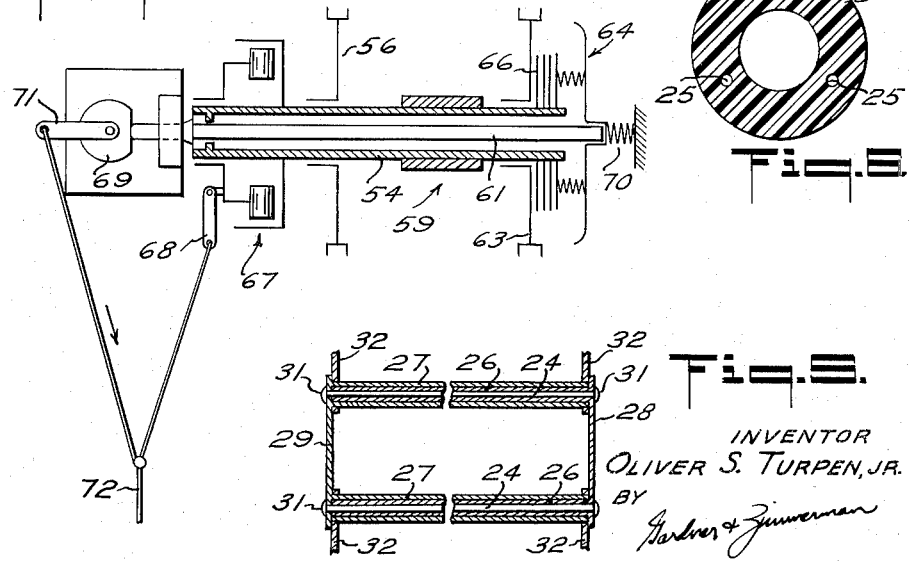

3,198,273
TRACK LAYING VEHICLE
Oliver S. Turpen, Jr., Danville, Calif., assignor to Dynamech Corporation, Danville, Calif., a corporation of California
Filed Nov. 6, 1961, Ser. No. 150,373
10 Claims. (Cl. 180—6.7)

This invention relates generally to self propelled vehicles and more particularly to a track laying vehicle for traversing terrain which is adverse to normal travel.

Although track laying motor vehicles are generally well known in the art, the present invenion is intended to improve upon various disadvantages existing in conventional vehicles of this character. In particular, track laying vehicles have previously been characterized by a pair of spaced apart endless tread assemblies mounted respectively on a pair of sprocket wheels. In general, there is a central gap intermediate the two tread assemblies on the underside of the vehicle whereby upward projections from an otherwise level terrain in many situations prevents progress of the vehicle. That is, if the ground irregularity is disposed beneath the vehicle intermediate the treads, it may not be possible for the threads to gain traction with the ground, thereby rendering the vehicle unable to move. Some track laying devices have remedied this situation to some extent by extending the treads below the underside of the vehicle body whereby in effect a tunnel is formed between the two treads. This also, however, has its limitation in that the tunnel is not sufficient to allow progress over terrain having irregularities higher than the tunnel itself.

Additional difficulties with conventional devices are encountered in traversing snow, mud, or otherwise slushy terrain. Since the weight of the vehicle load is necessarily limited by the vehicle's contact area with soft ground, the spaced apart tread assemblies of conventional vehicles do not provide optimum weight support under these conditions. The present invention affords novel apparatus for enabling a vehicle of given size and dimensions to traverse slushy terrain with a minimum tread contact load, thus permitting a larger gross vehicle load than heretofore possible.

A further problem presented by conventional vehicles is that the tread assemblies are in general disposed around two sprocket wheels, one of which is usually driven and the other of which is an idler wheel. With this configuration it is necessary to apply tension to the tread assembly to prevent it from jumping off of the sprocket teeth. This situation makes it difficult and tedious to repair or change tread members or the tread assembly, and in general adds to the complexity and expense of the vehicle.

The present invention is directed towards a novel vehicle designed to overcome the foregoing difficulties encountered with vehicles of the prior art. In broad terms, the body of the instant vehicle is substantially cylindrically shaped, and has its exterior surface adapted to form a track for carrying a tread assembly. The vehicle is arranged to have its entire bottom surface substantially completely covered by tread members whereby the aforementioned difficulties with regard to the underside gap or tunnel of conventional vehicle are eliminated. Furthermore, the configuration of the instant tread assembly provides greater weight support on soft or slushy terrains. In addition, the instant vehicle has the tread assembly mounted directly on the continuous curved surface of the vehicle body instead of on drive and idler sprockets, this feature serving to eliminate the need for applying tension to the tread assembly as well as the danger of the tread assembly slipping off of the sprockets of other drive means.

It is accordingly a main object of the invention to provide a vehicle of the character described having a novel endless tread assembly for facilitating travel over irregular and adverse terrain.

Another object of the invention is to provide a vehicle of the character described in which the weight of the vehicle is distributed over a substantial tread area, thus permitting ready travel over snow, mud, or otherwise slushy or soft terrain.

A further object of the invention is to provide a tread assembly for track laying vehicles which is adapted to engage the vehicle body to thereby minimize danger of losing a tread assembly without the need for tension or drive and idler sprocket wheels.

Still another object is to provide a tread assembly of the character described which is easily repaired without having to remove the whole assembly from the vehicle on which it is mounted.

An even further object is to provide a tread assembly adapted to cover the entire bottom surface of a track laying vehicle and having a plurality of tread members provided with means for facilitating stopping, turning and forward and rearward progress of the vehicle.

Yet another object is to provide a vehicle of the character described having an extremely low center of gravity thereby enhancing the vehicle's maneuverability and allowing it to traverse steep inclines.

Still another object is to provide a vehicle of the character described capable of travel through water.

Still another object is to provide a tread member for use with a tread assembly on a track laying vehicle which is adapted to indicate when it is worn.

Still another object is to provide a clutch and brake apparatus particularly suitable for use with a track laying vehicle of the character described.

The invention possesses other objects and features of advantage, some of which, with the foregoing, will be set forth in the following description of the preferred form of the invention which is illustrated in the drawing accompanying and forming part of he specification. It is to be understood, however, that variations in the showing made by the said drawings and description may be adopted within the scope of the invention as set forth in the claims.

FIGURE 1 is a partially cut away plan view of a vehicle comprising a preferred embodiment of the invention.

FIGURE 2 is a longitudinal cross-sectional elevational view of the vehicle shown in FIGURE 1, taken on the line 2—2 of FIGURE 1.

FIGURE 3 is a transverse cross-sectional view taken substantially on the plane indicated by line 3—3 of FIGURE 2.

FIGURE 4 is a partially diagrammatical illustration of the clutch and brake assembly forming a part of the instant invention.

FIGURE 5 is a cross-sectional view of a portion of the links used to comprise a preferred embodiment of the tread assembly of the invention; and FIGURE 6 is a cross sectional view through one of the rollers forming a tread member in the instant tread assembly.

FIGURE 7 is a diagrammatic side view of a modified version of the instant vehicle.

Referring now to the drawings, and particularly to FIGURES 1 and 2, there is shown a vehicle 11 having as its main body portion a cylindrically shaped shell 12, of generally elliptical form, the bottom surface of which is substantially flat and adapted for disposition adjacent the ground. Mounted directly on the shell 12 is a tread assembly 13, it being noted that the tread assembly affords a tread surface 14 which covers substantially the entire bottom surface of the vehicle 11. The tread assembly, which includes two laterally adjacent endless chains 16 and 17, is adapted to circulate around the shell 12 so as to propel the vehicle along the ground, it being further noted that a plurality of tread members 18 are carried by the chains 16 and 17. A pair of drive sprockets 19 and 21 are rotatably mounted in the rear of the vehicle and adapted to operatively engage the chains 16 and 17 for circulating them around the shell 12. Means for rotating the drive sprockets are contained within the shell 12 and are described in greater detail hereinafter.

With particular regard now to the tread assembly 13, the two endless chains 16 and 17 are disposed around the shell 12 substantially immediately adjacent one another and are adapted to carry tread members 18 so as to form a tread surface extending across the full width of the vehicle. The tread members 18 are disposed in groups of laterally aligned individual members, for example the group 22 as shown in FIGURE 1, the respective groups then being longitudinally spaced along the respective endless chains. In the preferred embodiment of the invention the tread members are shown as cylindrical rollers with fourteen in each group 22, a typical roller 23 being illustrated in FIGURE 6, although it will be appreciated that flat or cleated members can also be used to advantage in the instant invention. As seen in FIGURE 6, the roller 23 is preferably adapted with at least one longitudinal bore 25 spaced radially from the roller's axis, this bore serving to indicate when the roller has worn down. It is further noted that the cylindrical rollers are preferably composed of nylon or a hard wood, e.g., maple or the like.

The assembly of the chains 16 and 17, and the groups of rollers 22 carried thereon, is best described in reference to FIGURES 3 and 5, wherein is shown a pair of central rods 24 preferably made of nylon or suitable metal. A pair of inner sleeves 26 are disposed concentrically around the respective rods 24, and another pair of outer sleeves 27 are disposed around the inner sleeves 26. An outer link 28 is then rigidly connected between corresponding end portions of the inner sleeves 26, and the opposed end portions of the sleeves 27 are rigidly connected by another outer link 29, both the links 28 and 29 being adapted to have the central rods 24 pass therethrough. The rods 24 have enlarged end portions 31 for preventing axial movement of the inner and outer sleeves with respect to one another. A plurality of inner links 32 are then pivotally secured around the outer sleeves 27 adjacent the ends thereof and extend along the chain to couple with the next outer sleeves 28 (not shown). The group of rollers 23 are then rotatably mounted on the outer sleeves 27.

Prior to assembly of the chain, the rods 24 are provided without the enlarged end portions 31, this enabling the inner sleeve to be easily slipped over the rod. The rollers and inner links are then disposed over the outer sleeve which is next simply slid on to the inner sleeve. Now the end portions 31 can be formed on the rod 24 to secure the assembly in place, this operation being accomplished simply by heating the ends in the case of a nylon rod and molding the heated material into the desired enlarged shape. When the rods 24 are composed of metal the ends are enlarged by conventional metal working methods which may include heating and/or deformation by suitable force.

As seen in FIGURES 1 and 3, it is additionally desirable to provide an intermediate assembly of spaced apart links 33 along the length of each chain, this serving to strengthen the chains to receive the force of the drive sprockets. These inner links are rotatably mounted around the outer sleeves 27 intermediate the ends thereof and spaced apart by a portion of the rollers, preferably two, in each group 22.

Referring again to the vehicle body, it is desirable to provide means for eliminating abuse to the bottom of the vehicle shell. In this regard, a metal shoe or plate 34 is interposed between the tread assembly and the shell along the vehicle's underside and is removably bolted to the shell. Thus, when this plate is sufficiently pitted or abused, all that need be done is replace it with a new plate.

As further regards the vehicle body, a pair of side panels 37 are secured to each side of the shell 12 with a water tight fitting, each panel being provided with oblong side ports 38 to enable access to the machinery housed within the shell. A flange 39 extends outwardly from the panels 37 along the edge of the port 38 to provide means for mounting the exterior side panels 41 to the vehicle body, the exterior panels forming a water tight closure over the side access ports 38. It is further seen that a wall 42 is provided within the rear portion of the shell 12 to close off the portion thereof housing the drive sprockets 19 and 21 and thereby form a water tight chamber 43 for housing the motor, transmission and other members of the drive unit represented by the box 44. The provision of this water tight chamber also serves to enable the vehicle to float whereby it may be propelled in water, the motion of the tread assemblies being similar to that of a paddle wheel. An upper platform 46 is disposed on top of the shell 12 and is supported mainly by the side flanges 39, the platform being provided with a passenger seating portion 47 and also houses the instrument controls 48 for operating the vehicle.

In order to keep the tread assembly properly mounted around the shell 12, there are provided a pair of side guide flanges 49 and 51 which extend outwardly from the shell 12 along the side edges thereof. These side flanges extend no further than the tread members along the bottom of the vehicle, but along the top extend higher than the tread members to assure that slack in the chains does not allow them to shift laterally off of the body. It is further seen that a central guide flange 52 is provided around the shell 12 intermediate the laterally adjacent chains 16 and 17, this central flange serving to keep the two chains from contacting one another and is also provided with a high portion along the upper surface of the shell.

With regard now to the means for coupling power from the drive unit 44 to the chains 16 and 17, it is first noted that the drive sprockets 19 and 21 each extend through slits 55 in the shell 12 whereby they can engage the respective chains. Note further that the drive sprockets have a radius substantially smaller than that of the arcuate rear end portion 53 of the shell 12 whereby each sprocket engages only a portion of the chain disposed around this arcuate end. In this manner each chain is secured primarily by the shell and lateral guide means rather than by large tension loaded sprockets, it being observed that conventional tread assemblies generally have the chain disposed a full 180° around both drive and idler sprocket wheels.

As alternative guide means for preventing lateral displacement of the tread assembly, it is of course possible to utilize a pair of idler sprockets 60 disposed in the forward portion of the shell as is diagrammatically indicated in FIGURE 7. These two idler sprockets would centrally engage the respective chains 16 and 17 in a similar manner to that of the drive sprockets 19 and 21.

This modified embodiment of the invention would not necessitate employment of the guide flanges 49, 51 and 52. Moreover, because of the proportionately large width of the tread assembly in comparison to the vehicle's length, which is more fully described hereinafter, it would still not be required to apply tension to the respective chains. More specifically, it would be tolerable to allow lateral shifting of the tread assembly intermediate the vehicle's ends since the large width of the chains prevents them from sliding off the vehicle shell.

With regard to the further description of the means for coupling power to the tread assembly, note that only one chain is being described but that substantially identical means are coupled to each chain.

It is next seen that a shift 54 is journalled for rotation about its axis in the rear of the vehicle, there being provided a sprocket wheel 56 on shaft 54 which is coupled by a drive chain 57 or the like to a similar sprocket wheel 58 which is mounted on the same shaft as the drive sprocket 21 (see FIGURE 3). The sprocket 56 is preferably disposed outside the sealed chamber 43, the shaft 54 being journalled in water tight bearings.

As particularly regards the means for coupling power to the shaft 54, which in turn couples to the tread assembly as described above, reference is made to FIGURE 4 wherein is shown a clutch and brake assembly 59. The assembly 59 is seen to include the shaft 54, which is preferably of tubular configuration, and has a central actuating rod 61 slidably disposed therethrough. A belt 62, shown in FIGURE 2 is used to couple rotary power from the motor to a drive disk 63 secured rotatably on the shaft 54. A conventional clutch assembly 64, including a clutch disk 66, is then coupled between the shaft 54 and actuating rod 61 so as to engage or disengage the drive disk according to axial movement of the rod 61. A conventional brake assembly 67 is also coupled to the drive shaft 54 and is adapted to be operated by movement of a link member 68. A cam member 69 is pivotally secured adjacent one end of the rod 61 and is adapted to impart axial motion to the rod upon a pivotal motion of the cam. A lever arm 71 is rigidly secured to the cam to adapt it for pivoting upon movement of control line 72 which is coupled to the lever arm. The control line 72 is also coupled to the brake link member 68. By providing means for resiliently urging the rod 61 in a direction opposite to that which the cam member forces it, for example, a coil spring 70, the instant brake and clutch assembly is adapted for unitary control through the line 72. More particularly, the clutch mechanism as shown in the drawing is adapted to be in a normally engaged position, this of course transmitting power to the shaft 54. Upon pulling the control line 72 the cam displaces the rod 61 to the right thereby disengaging the clutch. A further continuous movement of the line 72 then begins to operate the brake assembly.

A handle 73 provided on the top platform of the vehicle is coupled to the control line 72 for operation thereof, this linkage being generally conventional. Similar linkage is also provided between the handle and the brake and clutch assembly for the other chain. As best described with reference to FIGURE 1, the linkage between the handle 73 and the two brake and clutch assemblies is so arranged that a forward and reverse motion is used to simultaneously engage or disengage the respective clutches and brakes. The linkage is further adapted so that rotating the handle 73 to either side makes it possible to engage only one or the other of the chains, this enabling the vehicle to be turned. Various degrees of relative control between the two chains is achieved by the degree of rotation of the handle 73.

In operating the vehicle, the motor and transmission are conventional and are operated in a conventional manner. To couple power from the motor to the respective chains, handle 73 is employed as described above, thereby engaging the two chains for circulation around the shell as is desired. By having the entire bottom of the vehicle covered by the instant tread assembly, the invention affords means for traversing rough and adverse terrain in a much improved manner. A particular feature to note is that each chain carries groups of laterally aligned individual rollers whereby it is not necessary to provide the vehicle with a differential for smooth turning. Instead, the rollers are free to move with relation to their radial position in the vehicle's turn. Moreover, the individual rollers provide for a smoother forward ride since an obstacle encountered along a portion of the treads does not impede movement of the other rollers.

With further regard to turning the vehicle, it is important to note that the dimensions of the vehicle's bottom surface are very critical. More particularly, it has been discovered that for optium performance the length of the bottom tread surface should be approximately twice as long as the width. If the length is any longer it becomes difficult to turn the vehicle, and if the length is any shorter the directional stability of the forward ride is hampered.

An additional feature to note is provided by the novel chain assembly of the instant invention. In conventional tractor vehicles it is generally necessary to remove a master chain link or remove the whole tread assembly from the vehicle in order to make repairs on the treads. By the provision of the central rod and associated sleeve members, the instant invention facilitates repairs by allowing them to be made while the body of the tread assembly remains on the vehicle. More specifically, to replace a roller all that need be done is snap off the enlarged ends 31 of the rods 24 whereby the inner and outer sleeves are simply slipped apart. Any suitable cutting tool can be used to sever the rod and reassembly of the chain is done as described hereinabove, it only being necessary to use new rods and to form again the enlarged end portions 31.

Even further advantage is derived from the instant invention because of the tread assembly covering the entire bottom surface of the vehicle. Since there is no tunnel or gap on the vehicle's underside, it is possible to mount the motor and associated equipment right on the bottom of the shell 12. It is readily appreciated that such disposition of the motor within the vehicle will result in a desirable low center of gravity, and in fact a prototype model of the instant invention was able to traverse an incline of 82°.

In a prototype model of the invention, the body was built with an over-all length of 82 inches and a width of 43 inches, the vehicle's height being 31 inches. A two cylinder, 22 horsepower engine was used and enabled the vehicle, which weighed 600 pounds, to gain a top speed of 30 m.p.h. With the entire bottom surface of the vehicle covered by the tread assembly in the manner of the invention, the pressure exerted on the ground, with the vehicle fully loaded, was about 0.5 p.s.i., which is comparable to that of a 200 pound man on snow shoes.

What is claimed is:

1. A self propelled vehicle comprising a body member having an exterior surface forming a generally continuous chain support, said body member having a substantially flat bottom surface adapted for disposition adjacent the ground, a pair of endless chains disposed around said support and adapted to move thereon, a plurality of rotatable ground engaging tread members carried by said chains forming a tread surface extending across the width of said body member, said rotatable tread members being positionable subjacent said bottom surface in engagement therewith and for engagement with the ground, said bottom surface having a length substantially twice as long as its width, said width of said bottom surface being substantially equal to the greatest width of said vehicle, and means for independently moving each of said chains and corresponding tread members around said track.

2. In a self-propelled vehicle, the combination comprising a generally cylindroidal body member having a continuous generally smooth exterior surface forming a chain support, said exterior surface including a substantially flat bottom surface adapted for disposition adjacent the ground, a pair of laterally adjacent endless chains disposed around said support and adapted to circulate thereon, a plurality of ground engaging tread rollers carried by said chain forming a tread surface of rollers extending across the width of said body member, said tread rollers being disposed in groups of laterally aligned individual rollers with said groups being longitudinally spaced along said chains, said tread rollers being positionable subjacent said bottom surface in engagement therewith and for engagement with the ground, means for independently moving said chains around said support, and guide means for preventing said chains from laterally sliding off said support.

3. The combination of claim 2 further characterized by said bottom surface having a length substantially twice as long as its width.

4. The combination of claim 2 further characterized by said rollers each being formed in the configuration of a cylinder, guide means including a first guide flange disposed around said support substantially adjacent one side of said body member, a second guide flange disposed around said support substantially adjacent the other side of said body member, and a third guide flange disposed around said support intermediate said laterally adjacent chains.

5. The combination of claim 4 further characterized by said guide flanges along said bottom surface extending from said support a distance substantially no greater than the diameter of said rollers, and said guide flanges along the upper surface of said body member extending from said support a greater distance than the diameter of said rollers.

6. A self propelled vehicle comprising a generally cylindroidal body member having a continuous smooth outer surface including a substantially flat bottom surface and two arcuate end surfaces, a pair of laterally adjacent endless chains disposed around said body member and adapted to circulate thereon a plurality of ground engaging cylindrical rotatable tread members carried on said chains and forming a tread surface extending across the width of said body member, said tread members being disposed in groups of laterally aligned individual members on each chain with said groups being longitudinally spaced along each chain, said body member having a pair of longitudinal slots in one end surface thereof with each slot disposed respectively intermediate the sides of said chains, a pair of sprocket wheels rotatably mounted within said body member and extending respectively through said slots to engage said chains, each said sprocket wheel having a radius substantially smaller than the radius of curvature of said arcuate ends of said body member whereby said sprockets engage only a portion of the chains disposed around said arcuate ends, said bottom surface having a length substantially twice as long as its width, said width of said bottom surface being substantially equal to the greatest width of said vehicle, a first guide flange disposed around said body member adjacent one side thereof for engagement with one said chain for lateral retention thereof on said body member, a second guide flange disposed around said body member adjacent the other side thereof for engagement with the other chain for lateral retention thereof on said body member, a third guide flange disposed around said body member intermediate said laterally adjacent chains for engagement therewith, said guide flanges along said bottom surface extending from said body member a distance substantially no greater than the diameter of said tread members, and said guide flanges along the upper surface of said body member extending therefrom a greater distance than the diameter of said tread members, and means for independently driving said sprocket wheels to thereby circulate said chains around said body member.

7. The combination of claim 6 wherein each said endless chain and corresponding tread members include a first shaft, a second shaft parallel to and spaced apart from said first shaft, a first inner sleeve disposed concentrically around said first shaft, a second inner sleeve disposed concentrically around said second shaft, a first outer sleeve disposed concentrically around said first inner sleeve, a second outer sleeve disposed concentrically around said second inner sleeve, a first link rigidly connected between corresponding end portions of said inner sleeves, a second link rigidly connected between the corresponding end portions of said outer sleeves adjacent the unconnected end portions of said inner sleeves, a first pair of spaced apart inner links each pivotally mounted around said first outer sleeve respectively adjacent the ends thereof, a second pair of spaced apart links each pivotally mounted around said second outer sleeve respectively adjacent the ends thereof, a first group of said laterally aligned cylindrical tread members rotatably mounted on said first outer sleeve intermediate said first pair of inner links, and a second group of said laterally aligned cylindrical tread members rotatably mounted on said second outer sleeve intermediate said second pair of inner links.

8. In an endless tread assembly, the combination comprising a first shaft, a second shaft parallel to and spaced apart from said first shaft, a first inner sleeve disposed concentrically around said first shaft, a second inner sleeve disposed concentrically around said second shaft, a first outer sleeve disposed concentrically around said first inner sleeve, a second outer sleeve disposed concentrically around said second inner sleeve, a first link rigidly connected between corresponding end portions of said inner sleeves, a second link rigidly connected between the corresponding end portions of said outer sleeves adjacent the unconnected end portions of said inner sleeves, a first pair of spaced apart inner links each pivotally mounted around said first outer sleeve respectively adjacent the ends thereof, a second pair of spaced apart links each pivotally mounted around said second outer sleeve respectively adjacent the ends thereof, a first group of cylindrical rollers rotatably mounted on said first outer sleeve intermediate said first pair of inner links, and a second group of cylindrical rollers rotatably mounted on said second outer sleeve intermediate said second pair of inner links.

9. Apparatus as described in claim 8 further characterized by said shafts each being composed of nylon, and said shafts each having enlarged ends adapted to inhibit axial motion of said first sleeves with respect to the corresponding second sleeves.

10. Apparatus as described in claim 8 further characterized by a third pair of spaced apart links pivotally coupled between said outer sleeves and disposed intermediate the ends thereof, a portion of the rollers of each said group being disposed intermediate said third pair of links and the remaining rollers of each said group being disposed intermediate the links of said third pair of links and the ends of said outer sleeves.

References Cited by the Examiner
UNITED STATES PATENTS

| | | | |
|---|---|---|---|
| 784,792 | 3/05 | Hutton | 305—18 |
| 993,037 | 5/11 | Cyr | 305—18 |
| 1,331,550 | 2/20 | Wishon | 305—17 X |
| 1,877,600 | 9/32 | Seiberling et al. | 152—153 |
| 2,074,319 | 3/27 | Baker et al. | 180—6.7 |
| 2,171,846 | 9/39 | Davidson | 305—25 X |
| 2,197,289 | 4/40 | Baker et al. | 180—6.7 |
| 2,383,754 | 8/45 | Watt | 305—18 X |
| 2,483,961 | 10/49 | Ball | 305—57 X |
| 2,756,830 | 7/56 | Hurthig | 305—18 X |
| 2,829,746 | 4/58 | Knochl | 192—12 |
| 2,867,480 | 1/59 | Cushman | 305—18 |
| 2,905,291 | 9/59 | Olson et al. | 192—12 |

ARTHUR L. LA POINT, *Primary Examiner.*

LEO FRIAGLIA, *Examiner.*